United States Patent [19]

Taylor

[11] 4,204,385
[45] May 27, 1980

[54] SEED HARVESTING APPARATUS

[76] Inventor: Clyde L. Taylor, 4146 W. Mineral King, Visalia, Calif. 93277

[21] Appl. No.: 920,779

[22] Filed: Jun. 30, 1978

Related U.S. Application Data

[63] Continuation-in-part of Ser. No. 776,872, Mar. 11, 1977, abandoned, which is a continuation of Ser. No. 596,718, Jul. 17, 1975, abandoned.

[51] Int. Cl.$^2$ .............................................. A01D 45/30
[52] U.S. Cl. ....................................... 56/14.3; 56/119; 56/126
[58] Field of Search ................................. 56/126–130, 56/119, 14.3–14.6, 98–106, 108, 13.8, 13.9; 198/494

[56] References Cited

U.S. PATENT DOCUMENTS

| | | | |
|---|---|---|---|
| 2,575,120 | 11/1951 | Peel | 56/126 |
| 2,867,961 | 1/1959 | Hedbrun | 56/119 |
| 2,867,962 | 1/1959 | Meyer | 56/14.5 |
| 3,031,832 | 5/1962 | Seifried | 56/119 |
| 3,260,041 | 7/1966 | McRoberts et al. | 56/126 |
| 3,415,044 | 12/1968 | Munson | 56/119 |
| 3,961,466 | 6/1975 | Martin et al. | 56/98 |

*Primary Examiner*—Jay N. Eskovitz
*Attorney, Agent, or Firm*—Flehr, Hohbach, Test, Albritton & Herbert

[57] ABSTRACT

Apparatus is disclosed for harvesting a crop of the character having stalks which carry seed pods, such as the sesame plant. The apparatus includes a harvesting vehicle which mounts at its front end a header structure. The header structure includes side-by-side guide units adapted for movement along individual rows of the stalks. Each guide unit includes a pair of forwardly diverging guide members which gently guide the stalks for relative movement toward rotary cutter units disposed generally at the apex of the guide members. Horizontally extending, spaced-apart stabilizer fingers are mounted for movement along each guide unit in a path toward the cutter units for stabilizing the stalks prior to and during the time that they are cut off. Drive apparatus is provided for controlling rearward movement of the fingers at a rate substantially equal to the rate of forward vehicle travel whereby the fingers maintain registry with the stalks up to the point at which they are cut off. A take-away conveyor is provided and comprises an endless belt which is joined together at its ends to form a flap which projects in a direction rearwardly and downwardly along the lower run of the conveyor. A control system is provided to selectively reverse conveyor movement so that the flap is moved across the upper surface of a panel below the conveyor for sweeping seeds rearwardly toward a crop collecting conveyor on the vehicle.

12 Claims, 6 Drawing Figures

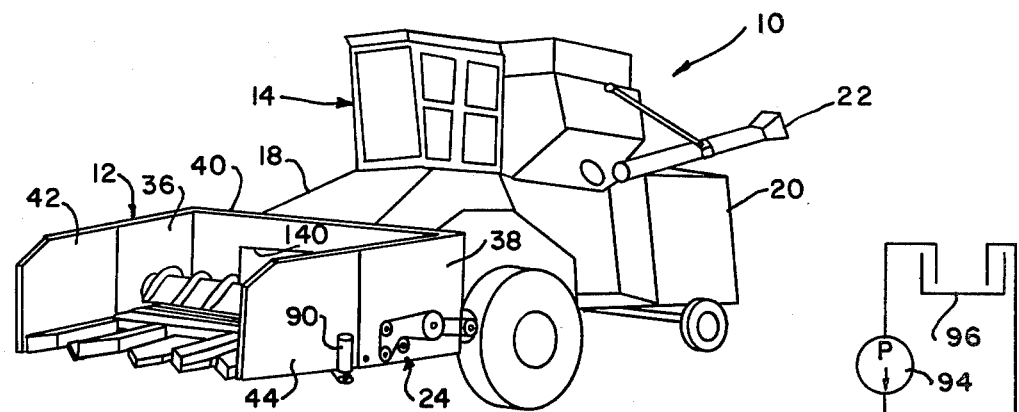
FIG.—1
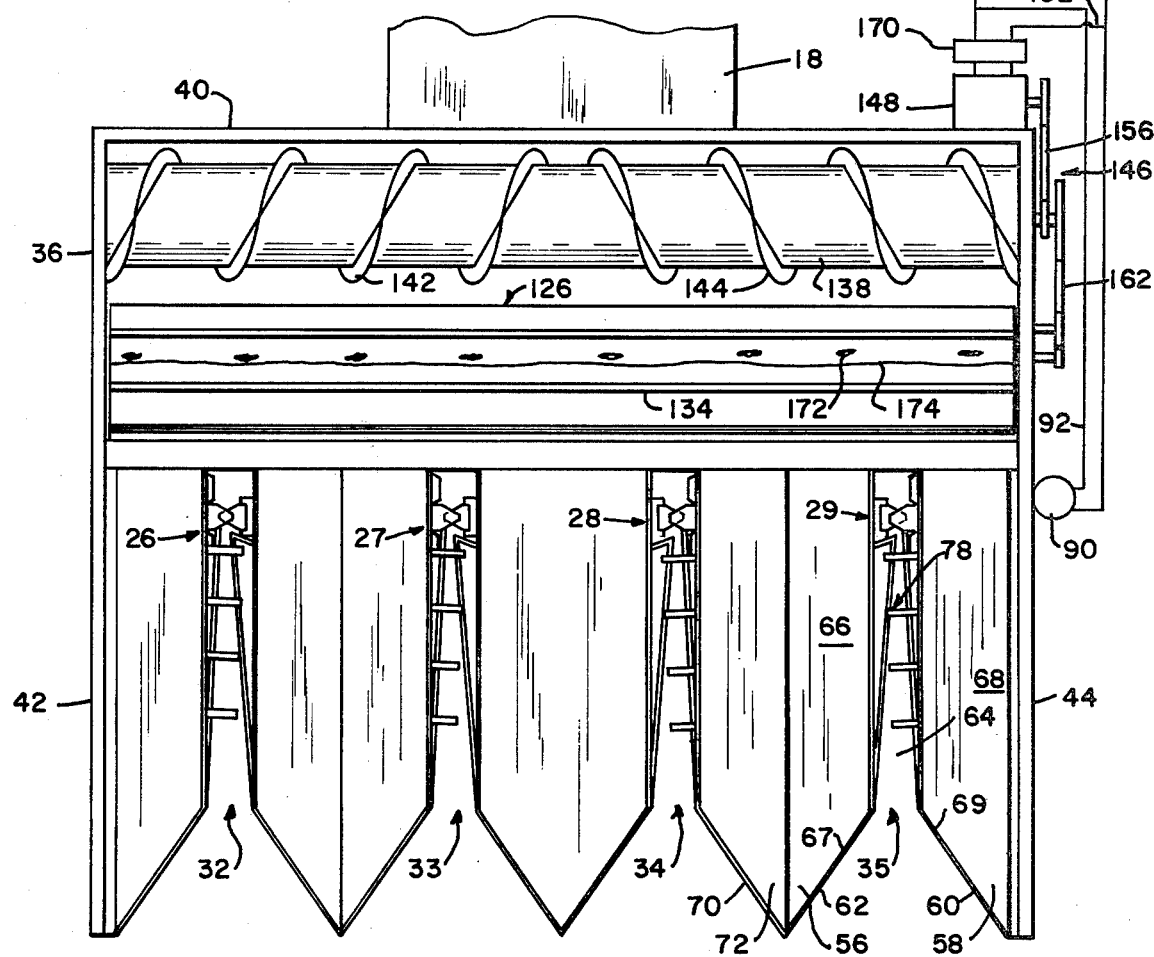
FIG.—2

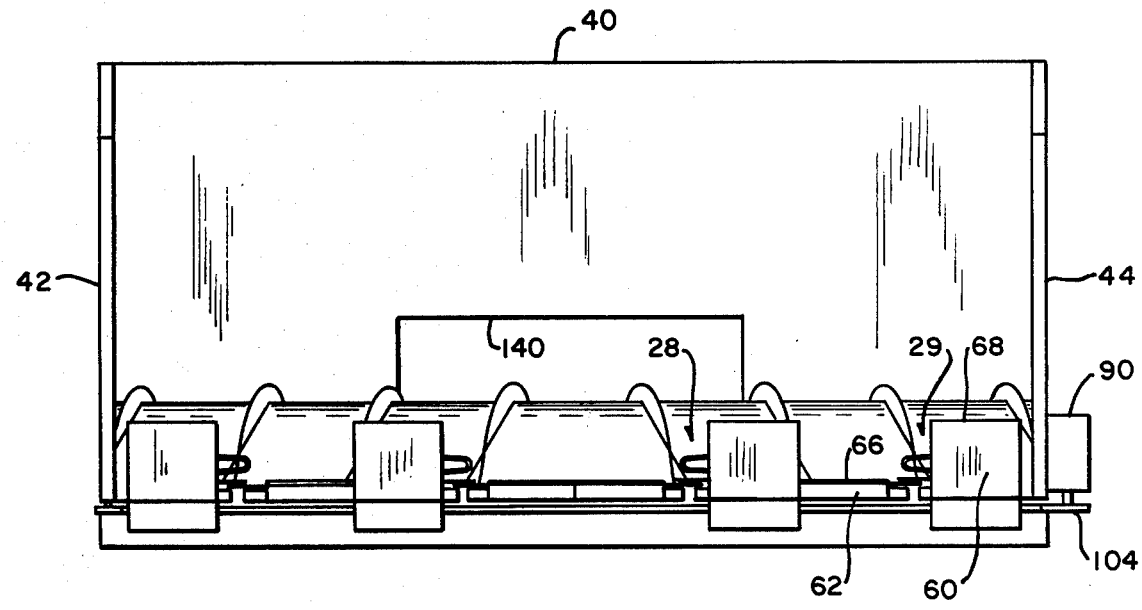
FIG.—3
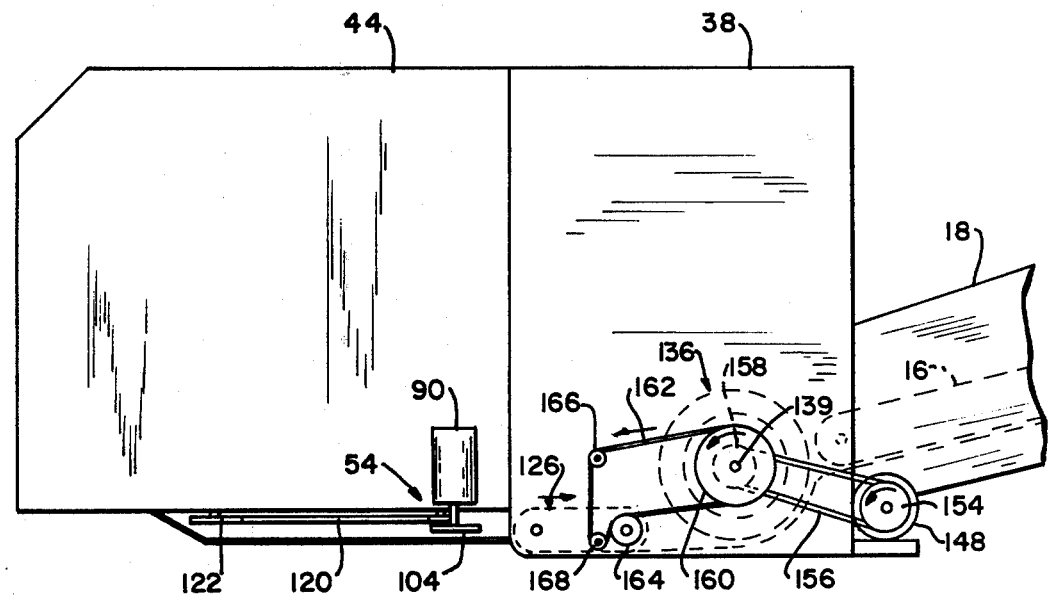
FIG.—4

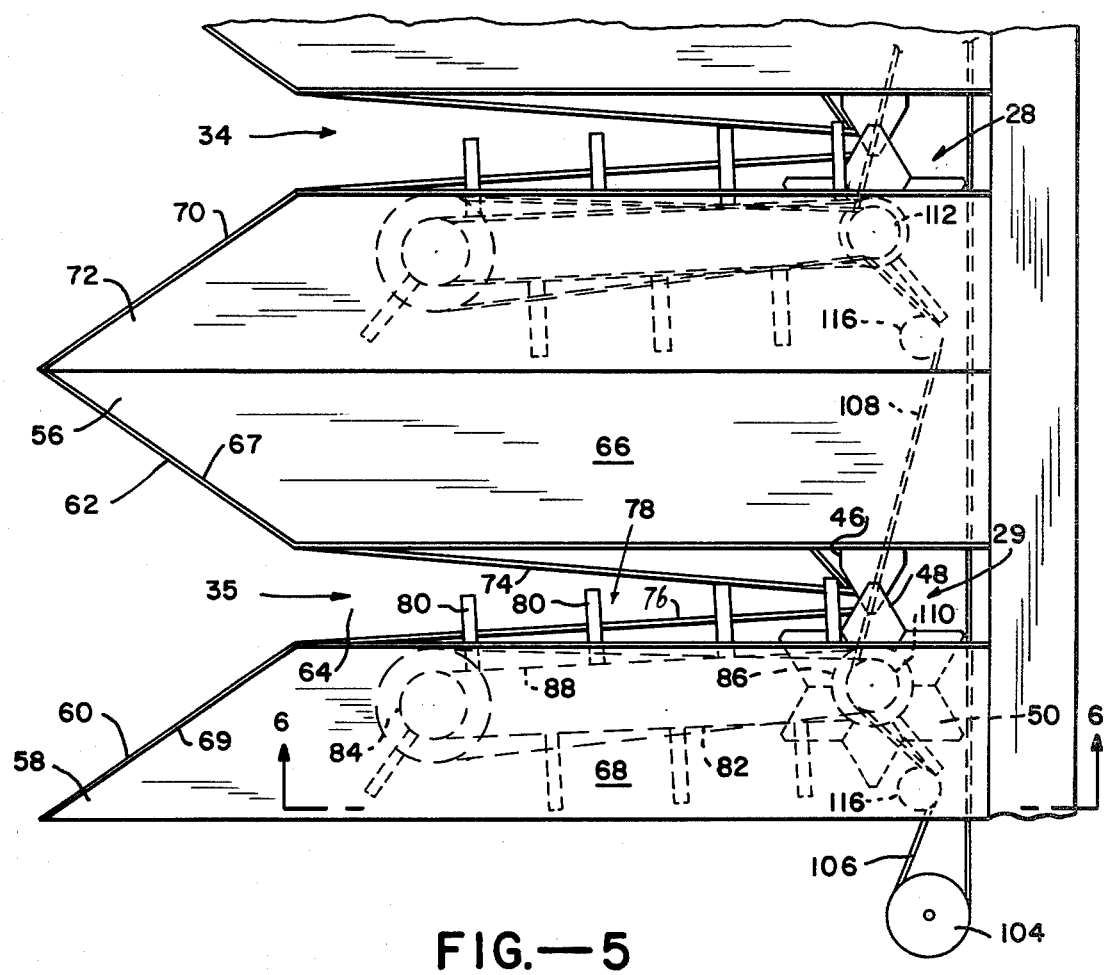
FIG.—5
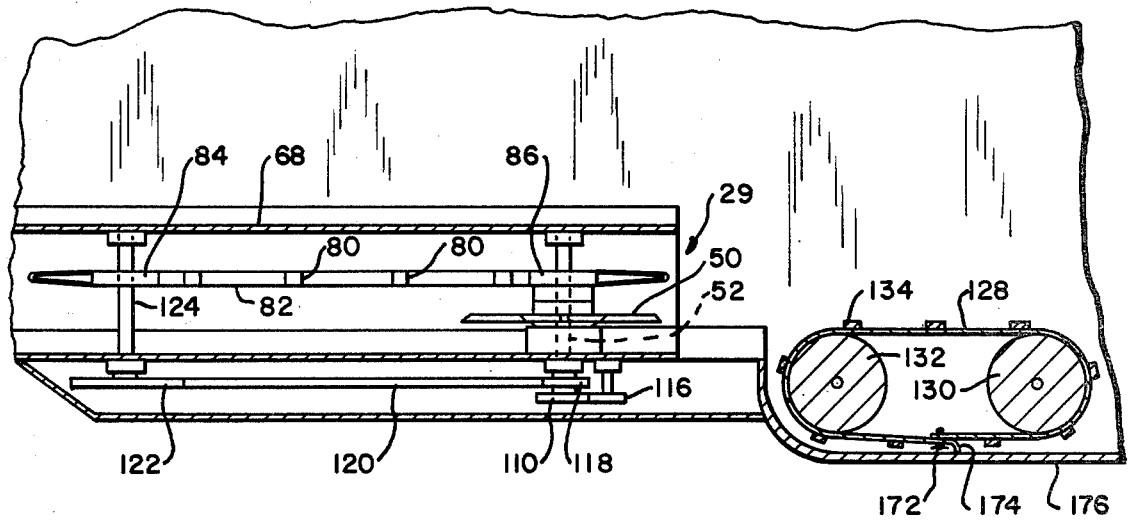
FIG.—6

SEED HARVESTING APPARATUS

RELATED CASES

This application is a continuation in part of application Ser. No. 776,872 filed on Mar. 11, 1977, now abandoned which is a continuation of application, Ser. No. 596,718 filed on July 17, 1975, now abandoned.

BACKGROUND OF THE INVENTION

This invention relates in general to harvesting machinery and in particular relates to the harvesting of crops which are characterized in having stalks which carry seed pods that tend to easily shatter and release seeds when moved or jarred.

Crops which have fragile seed pods of the type described include the sesame plant. Sesame seeds are of increasing importance as a source of protein and other food values in view of the population explosion, the relative decrease in food supply, and the resulting increase in world malnutrition and starvation problems.

Sesame plants when ready for harvest comprise stalks which are six to eight feet in height with many seed-bearing pods attached to the stalk of each plant. It is a characteristic of these sesame plants that the ripe pods carrying the seeds are fragile such that the pods have a tendency to shatter and open when moved or jarred so that the seeds from each pod fall to the ground and are lost.

Heretofore the foregoing problem of pod shattering has precluded practical mechanical harvesting of sesame crops. When conventional grain harvesters having a reel and sickle are utilized a loss of from 70 to 90% of the seed is encountered. As a result it has been necessary to manually harvest these crops. The resulting high labor content in the harvesting operation has resulted in low yields and high crop costs. Thus the need has been recognized for apparatus which will harvest crops such as sesame plants without substantial product loss. With such mechanical harvesting apparatus the sesame crop could be more fully employed in solving the world food problem.

OBJECTS AND SUMMARY OF THE INVENTION

It is a general object of the invention to provide a new and improved apparatus for harvesting crops such as sesame plants.

Another object is to provide apparatus of the type described which is adapted to harvest a crop characterized in having seeds carried in fragile pods such that seed loss during harvest is minimized.

Another object is to provide apparatus of the type described in which the plant stalks are stabilized by moving fingers as the stalks are gently guided along a path toward cutting means such that the cut stalk falls rearwardly toward a take-away conveyor.

Another object is to provide apparatus of the type described in which any seed falling from pods which may shatter during harvesting are collected on pans and directed toward the take-away conveyor.

The invention in summary includes a header structure which is mounted on the front end of a harvesting vehicle. The header structure includes a plurality of laterally spaced-apart guide units each of which includes a pair of guide members which diverge forwardly from an apex for gently guiding the stalks in relative movement toward cutter means at the apex. The cutter means includes a stationary blade together with a plurality of blades mounted for rotation about an axis relative to the stationary blade. Each guide unit further includes a plurality of horizontally extending stabilizer fingers which are mounted in spaced-apart relationship on an endless carrier for movement in a path lying in a plane above the cutter blades. Drive means is provided for moving the fingers in a direction toward the cutter means at a rate equal to forward vehicle movement so that the fingers stabilize the stalks prior to and during the time that they are cut off. The cut stalks and seeds are directed onto a take-away conveyor comprising an endless belt which is driven so that its upper run moves the product to a feed auger and into the harvesting vehicle. A flap on the belt of the take-away conveyor projects in a direction downwardly and rearwardly of the lower run so that selective reverse movement of the belt moves the flap across the upper surface of a pan to scoop seeds rearwardly toward the take-away conveyor.

The foregoing and additional objects and features of the invention will become apparent from the following description in which the preferred embodiments have been set forth in detail in conjunction with the accompanying drawings.

BRIEF DESCRIPTION OF THE DRAWINGS

FIG. 1 is a perspective view of harvesting apparatus incorporating the invention.

FIG. 2 is a top plan view of the header structure of the apparatus of FIG. 1.

FIG. 3 is a front elevational view of the header structure of FIG. 2.

FIG. 4 is a side elevational view of the header structure.

FIG. 5 is a fragmentary top plan view of component parts of the header structure.

FIG. 6 is a longitudinal sectional view taken along the line of 6—6 of FIG. 5.

DESCRIPTION OF THE PREFERRED EMBODIMENT

In the drawings FIG. 1 illustrates generally at 10 apparatus which is specially adapted in accordance with the invention for harvesting a crop such as sesame seeds which grows on stalks carrying seed pods. Apparatus 10 comprises a header structure 12 mounted on the front end of a harvesting vehicle 14. The vehicle in the illustrated embodiment comprises a design having pneumatic tires and is driven by a suitable internal combustion engine. Header structure 12 operates to cut and convey the crop in a manner to be described into an upwardly inclined conveyor 16 (FIG. 4) disposed within the front end housing 18 of the vehicle. The vehicle incorporates conventional equipment for separating the seeds from the stalks, leaves and other refuse, and a bin 20 is provided at the rear of the vehicle for temporary storage of the seed. The stalks and refuse are discharged to one side of the vehicle through a discharge spout 22. The construction and operation of the seed separating apparatus is broadly conventional and thus need not be described in further detail.

Header structure 12 comprises a frame 24 which is mounted on and projects forwardly of the housing 18. The frame carries a plurality of cutter units 26–29 which are transversely spaced apart a distance substantially equal to the distance between the rows of the crop. In the illustrated embodiment adapted for harvesting sesame plants four cutter units are provided at thirty inch spacing between each unit where the rows of plants are thirty inches apart. A plurality of guide units 32–35 are mounted on the frame in association with respective cutter units. The guide units serve to guide the stalks, which may be leaning or bent in random directions, into alignment toward the cutter units as the vehicle moves along the rows.

Frame 24 includes upstanding side walls 35, 38 and rear wall 40 which form an upwardly and forwardly open enclosure for receiving the harvested crop. These walls together with a pair of wall extensions 42, 44 mounted along the guide units 32, 35 retain and channel the cut stalks and seed back toward the rear of the enclosure.

The cutter unit 29 and associated guide unit 35 are typical of the units and will be described in detail, and it is understood that the remaining cutter and guide units are similar in construction and operation. Cutter unit 29 comprises a fixed blade 46 which is formed with a sharpened forwardly directed cutting edge, together with a plurality of triangularly shaped rotary blades 48 mounted about the periphery of a wheel 50 which in turn is mounted for rotation about a vertical axis on a shaft 52. Drive means 54 is provided for turning shaft 52 clockwise when viewed from above so that movement of the rotary blades across the upper surface of the fixed blades creates a scissors-type cutting action which cleanly severs the stalks. The cutter units 26–29 are mounted at a predetermined distance above the ground, depending upon the crop which is being harvested. Where the crop is the sesame plant the cutter units are preferably mounted so that the stalks are cut off at a minimum height of six inches.

The typical guide unit 35 is defined by a flat sheet metal pan 56 and a hollow sheet metal housing 58 which encloses rotary blades 48 and the drive means 54. The pan 56 and housing 58 are mounted on and project forwardly from frame 24. Housing 58 includes an upstanding side wall 60 which is inclined in a direction rearwardly and toward cutter unit 29, while the opposed pan 56 is formed with a side surface 62 which is inclined in an opposite direction so that the wall 60 and surface 62 diverge forwardly and co-act to guide portions of the stalks inwardly toward an elongate channel 64 defined between the rearward portions of pan 56 and housing 58. The top wall 66 of the pan as well as the top wall 68 of the housing are mounted to incline forwardly and upwardly, and these walls are bounded by short upstanding rims 67, 69 so that any seeds which fall from the pods as the header approaches the stalks will be collected on the top walls and moved by the action of gravity and vehicle vibration in a rearward direction for subsequent collection. The opposite upstanding side wall 70 of the adjacent housing 72 comes to a point with surface 62, and this side wall serves as a crop guiding surface for the adjacent guide unit 34. A pair of guide members 74, 76 are mounted on the guide unit on opposite sides of channel 64. These guide members each comprise elongate flat straps which are positioned to diverge forwardly from an apex in the region of cutter unit 29. The angle at which the guide members are inclined from the longitudinal direction is relatively small, and in the illustrated embodiment is in the range of 4° to 6°. This small angle of incline of the guide members serves to gently urge toward the center line of the cutter unit 29 any stalks which may be leaning, bent or otherwise not in proper alignment for cut off by the blades.

Stabilizer means 78 is provided for stabilizing and holding the stalks as they proceed along channel 64 between guide members 74 and 76. The stabilizer means includes a plurality of horizontally extending stabilizer fingers 80 mounted at spaced-apart positions about an endless carrier chain 82. The carrier chain is trained between a drive sprocket 84 and a driven sprocket 86 which in turn are mounted for rotation about vertical axes. The drive sprocket 84 is driven in a clockwise direction, as viewed from above, to move the chain so that its outer run 88, which lies in a plane disposed above guide member 76, carriers the stabilizer fingers along a path inclined at a small angle from the longitudinal direction toward cutter unit 29. The angle of inclination of chain run 88 from a longitudinal direction is substantially equal to the corresponding angle of inclination of guide member 76 so that rearward movement of run 88 causes the fingers to project outwardly from and move generally parallel with this guide member.

Drive means 54 is connected to drive stabilizer fingers 80 in conjoint relationship with rotation of cutter blade wheel 50 and also in conjoint relationship with forward vehicle movement. The drive means includes a suitable drive motor 90, which preferably comprises an hydraulic motor receiving pressurized fluid through conduit 92 from an hydraulic pump 94 and reservoir 96, with return fluid being directed back to the reservoir through conduit 98. An on-off valve 100 is provided in the circuit as well as a flow control valve 102 for selectively controlling the the speed of drive motor 90 and thereby control the speed of the cutter units and stabilizer fingers.

Drive motor 90 turns a drive sprocket 104 connected with an endless chain 106 which has its forward run 108 trained through a series of driven sprockets 110, 112 and idler sprockets 114, 116 for conjointly operating each of the cutter and guide units. The cutter unit 29 is operated from driven sprocket 110 keyed on vertical shaft 52 which directly rotates the blade wheel 50. The guide unit 35 is operated from a drive sprocket 118 which is also keyed on shaft 52 for driving carrier chain 82 and a driven sprocket 122. The sprocket 122 drives a shaft 124 which is keyed with the drive sprocket 84 of stabilizer means 78. The driven sprocket 86 at the rearward end of the carrier chain is mounted for free rotation on the end of the shaft 52.

The diameters of the sprockets 118 and 122 are selected so that a large speed ratio, preferable on the order of 3:1, is established between the peripheral speed rotary blades 48 and the speed of fingers 80. In addition, control valve 102 of the hydraulic circuit is selectively controlled during a harvesting operation so that the rearward speed of movement of the fingers 80 relative to the vehicle is substantially equal to the forward group speed of the vehicle. This speed relationship causes the stabilizer fingers to maintain zero ground speed so that the fingers remain in register with the stalks. As a result the stalks are gently stabilized by the fingers during their movement toward and at the time of cut-off by the blades without being jolted or moved to any appreciable degree longitudinally of their ground location so that the seed pods are not unduly shaken or disturbed. In addition, bent or leaning stalks which are contacted by the forwardly moving inclined guide members 74 and 76 will be prevented by the stabilizer fingers from being pushed forward any appreciable amount by the guide members. Thus the stabilizer fingers gently hold the stalks against longitudinal displacement while the relative forward movement of the guide members coact to gently move the leaning or bent stalks toward the center line of the channel 35 for proper cut off operation.

As illustrated in FIG. 5 the driven sprocket 86 of carrier chain 82 is disposed above the region of cutter unit 29 so that the fingers are carried in an arcuate path over the cutting zone. The resulting angular acceleration of the fingers along this arcuate path assists in urging the immediately cut stalks in a direction rearwardly toward a take-away conveyor 126 mounted behind the cutter units. In addition, the forward velocity of the vehicle is such that the stalks tend to fall head first and backward by gravity onto the take-away conveyor. Seeds which fall from the shattered pods as the stalks are cut will also fall onto the take-away conveyor.

Take-away conveyor 126 comprises an endless belt 128 mounted between a drive drum 130 and a driven drum 132 which in turn are mounted for rotation about transverse axes between the side walls of frame 24. A plurality of transversely extending spaced-apart cleats 134 are mounted on the outer surface of the belt to assist in moving the harvested crop rearwardly for discharge into a feed auger 136.

Feed auger 136 comprises a hollow cylindrical shell 138 mounted on an axle 139 for rotation about a transverse axis between the discharge end of take-away conveyor 126 and an opening 140 in rear wall 40 leading to the infeed end of crop-receiving conveyor 16 within the vehicle. An auger flight 142 having a left-hand thread pitch is mounted about the left end of the shell while an auger flight 144 having a right-hand thread pitch is mounted about the right end of the shell so that rotation of the shell in a counter-clockwise direction, as viewed in FIG. 4, feeds the crop towards the center of the auger from which it is carried away by conveyor 16.

Drive means 146 is provided for conjointly operating the take-away conveyor and auger. The drive means in the illustrated embodiment includes an hydraulic motor 148 powered by pressurized fluid received through conduit 150 from hydraulic pump 94, with return fluid being directed through conduit 152 back to the reservoir. Motor 148 is coupled with a drive sprocket 154 which in turn drives auger 136 through an endless chain 156 and driven sprocket 158. A drive sprocket 160 keyed to the axle 139 drives the take away conveyor through means of an endless chain 162 which is trained around a driven sprocket 164 connected with conveyor drive drum 130 as well as a pair of idler sprockets 166, 168. A suitable flow reversing control valve 170 is provided in the hydraulic circuit for selectively reversing the direction of operation of motor 148 and thereby reverse the take-away conveyor.

The belt 128 of conveyor 126 is joined together at its ends by suitable fasteners 172 with one end 174 of the belt overlapping with and projecting in a direction which is inclined rearwardly and downwardly of the lower run, as illustrated in FIG. 6. A panel 176 is mounted below this conveyor in close spaced relationship with this lower run. When the flap moves along the lower run it moves across the upper surface of the panel and scoops any seeds collected thereon rearwardly to the auger. Thus, when it is desired to clean out seed from beneath the conveyor the operator reverses the drive motor 148 for driving belt 128 counter-clockwise for a short period of time, afterwhich the drive motor is again reversed for driving the belt clockwise to resume the harvesting operation.

The use and operation of the invention will be explained in relation to the harvesting of a sesame crop planted in thirty inch rows. Vehicle 14 is moved along the rows while simultaneously operating the cutter and stabilizer drive motor 90 and the take-away conveyor and auger drive motor 148. The drive means 54 from motor 90 simultaneously powers the four cutter units 26–29 to turn the rotary cutter blades in a scissorstype cutting action across the respective stationary blades. The drive train also simultaneously operates the four stabilizer finger chains to move in a rearward direction toward the respective cutter units, with flow control valve 102 being set so that the speed of finger movement relative to the vehicle is equal to vehicle ground speed.

As the vehicle moves forward the stalks of the plants which may be leaning or bent from the center line of the rows are gradually and gently urged inwardly toward the center line by the inclined surfaces 60 and 62. When the channel 64 of each guide unit progresses to the stalks the stabilizing fingers 80 emerge along the outer run of the carrier chain and project laterally between the stalks. Continued forward movement of the vehicle causes the inclined guide members 74, 76 to further gently urge the stalks toward the center line while the fingers 80, due to their zero ground speed, remain stationary relative to the stalks and tend to hold and stabilize the stalks against longitudinal movement up to and during the time that they are cut off by the cutter units. While the stalks are moving in the region of the header structure, any seeds which fall from the pods will tend to be collected on the surfaces of the top walls 66, 68 from which they move rearwardly by the action of gravity and vibration toward take-away conveyor 126. As the stalks are cut off by the cutter units they will fall head first rearwardly onto the take-away conveyor, the upper run of which moves rearwardly to carry the stalks and seeds into auger 136. Rotation of the auger feeds the product toward its center for discharge into conveyor 16 which in turn carries the product into the seed separating apparatus within the vehicle. When it is desired to clean out seeds below the take-away conveyor, the vehicle is stopped and motor 148 is reversely operated for moving the belt 128 counterclockwise so that its flap 174 moves across the upper surface of panel 176 to scoop the seeds rearwardly into the auger.

It will be realized from the foregoing that there has been provided a new and improved apparatus for harvesting a crop of the character having fragile pods which may be easily shattered and prematurely release seeds. The apparatus of the invention employs a mode of operation which gently guides and stabilizes the plant stalks for the cutting action such that seeds and stalks which are cut are efficiently collected with a much higher percentage of seed recovery as compared to conventional machinery in harvesting crops of this type.

While the foregoing embodiment is at present considered to be preferred, it is understood that numerious variations and modifications may be made in it by those skilled in tha art and it is intended to cover in the appended claims all such variations and modifications as fall within the true spirit and scope of the invention.

What is claimed is:

1. In an apparatus for harvesting sesame stalks standing in rows in a field and having pods thereon carrying sesame seeds therein, said pods being of a type which have a tendency to shatter and release their seeds when they are moved or jarred, a vehicle adapted to be moved through the field, stalk severing apparatus carried by the vehicle, said stalk severing apparatus including first and second stalk guiding assemblies defining a generally V-shaped opening for receiving and guiding stalks as the vehicle is advanced in the field, an upwardly facing seed receiving pan which is open throughout its entire length carried by each of said stalk guiding assemblies for receiving and collecting seeds which accidentally fall from the pods during the time the stalks are moving in the generally V-shaped opening between the guiding assemblies, said pan for each stalk guiding assembly extending up to the forwardmost extremity of the stalk guiding assembly, rotary-type cutoff means operating at a high rate of speed disposed in the vicinity of the rear of said generally V-shaped opening for severing said stalks as they travel in the generally V-shaped opening with a minimum of vibration to thereby minimize the scattering of seeds from the pods as the stalks are severed, conveyor-type means carried by the vehicle for collecting severed stalks and the seeds collected in said seed receiving pans and seed separating means carried by the vehicle for receiving the stalks and seeds from the conveyor-type means, at least one of stalk guiding assemblies including a plurality of fingers extending into said generally V-shaped opening and in the vicinity of the rotary cutoff means extending substantially traversely across said V-shaped opening and means for moving said fingers in said opening at a speed which is approximately equal to the speed of movement of the vehicle in the field for maintaining the stalks in generally upright positions without jolting of the stalks as they are advanced through the V-shaped opening, said fingers being adapted to engage said stalks in the V-shaped opening prior to, during and after the time they are cut off by the rotary cut off means.

2. Apparatus as in claim 1 in which the rotary-type cutoff means includes a rotary cutter which travels at a speed which is the order at least of 3 to 1 times the speed of the fingers.

3. Apparatus as in claim 1 wherein said means for moving said fingers in said generally V-shaped opening includes drive means disposed below the seed receiving pan of the stalk guiding assembly.

4. Apparatus as in claim 3 wherein said means for driving said fingers includes an endless carrier traveling in an arcuate path in the vicinity of the rotary-type cutoff means whereby as said fingers travel over said arcuate path, they accelerate movement of the stalks away from the generally V-shaped opening and onto the conveyor-type means.

5. Apparatus as in claim 1 together with seed separating apparatus carried by the vehicle for removing the sesame seeds from the pods.

6. Apparatus as in claim 2 in which the rotary cutoff means and the means for moving said fingers includes a common hydraulic drive motor.

7. Apparatus as in claim 1 wherein said conveyor-type means carried by the vehicle includes a feeder housing a U-shaped frame secured to the feeder housing and having an opening therein in communication with the feeder housing, a feed auger rotatably mounted in the U-shaped framework for rotation about an axis transverse to the direction of travel of the harvester, said feed auger having right and left handed flights for advancing material from opposite sides of the U-shaped framework towards the center and into the opening into the feeder housing, an endless belt-type take away conveyor mounted in the U-shaped framework immediately to the rear of the stalk guiding assemblies and extending into relatively close proximity to the feed auger so that stalks and pods which are severed and delivered onto the endless conveyor are delivered to the feed auger and from the feed auger into the feeder housing.

8. Apparatus as in claim 2 wherein said rotary-type cut-off means includes a fixed blade, a wheel, a plurality of blades removably carried by said wheel, said blades having V-shaped recesses therebetween extending inwardly toward the center of the wheel so that the stalks can enter the recesses and be severed by cutting action between the next blades of the wheel and the fixed blade.

9. Apparatus as in claim 8 wherein said blades carried by said wheel are generally triangularly shaped.

10. In a stalk severing apparatus for use with a harvesting machine of the type having a crop receiving conveyor and a seed separator for use in harvesting sesame seed from sesame stalks standing in a field and having pods thereon carrying sesame seeds therein, the pods being of a type which have a tendency to shatter and release the seeds therein from when they are moved or jarred, the apparatus comprising first and second stalk guiding assemblies defining a generally V-shaped opening for receiving and guiding stalks as the vehicle is advanced in the field, an upwardly facing seed receiving pan which is open along its entire length carried by each of said stalk guiding assemblies for receiving and collecting seeds which accidentally fall from the pods during the time that the stalks are moving in the generally V-shaped opening, said pan for said stalk guiding assembly extending up to the forwardmost extremity of the stalk guiding assembly, rotary-type cutoff means opening at a high rate of speed disposed in the vicinity of the rear of said generally V-shaped opening for severing said stalks as they travel in the generally V-shaped opening with a minimum of vibration to minimize the scattering of seeds from the pods on the stalks and for delivering the stalks to the conveyor, a plurality of fingers, and means for moving said fingers in said generally V-shaped opening to engage said stalks at a speed which is substantially equal to the speed of movement of the stalk severing apparatus in the field to maintain the stalks in a generally upright position, said fingers in the vicinity of the rotary cutoff means extending substantially transversely across said V-shaped opening so that the fingers are adapted to engage said stalks in the V-shaped opening prior to, during and after the time they are cut off by the rotary cut-off means.

11. Apparatus as in claim 10 wherein said crop receiving conveyor comprises a U-shaped framework having an open front side with the stalk guiding assemblies disposed in the forward extremity of the U-shaped framework with the V-shaped openings between the stalk guiding assemblies facing toward the opening in the front side, a feeder housing secured to the framework, an opening in the framework in communication with the feeder housing, a feed auger disposed in the U-shaped framework immediately in front of the opening and having an axis of rotation perpendicular to the V-shaped openings, said feed auger having right and left hand flights for advancing material from opposite sides of the framework into the opening of the feeder housing and an endless conveyor belt mounted within the framework to the rear of the stalk guiding assemblies for advancing material as it is severed into the feed auger and for the feed auger to advance the same into the feeder housing.

12. A header assembly for use with a harvesting vehicle having a crop receiing conveyor at its front end and in which the crop is of the character comprising upstanding stalks, the header assembly comprising a combination of a frame adapted for mounting on the front end of the vehicle, cutter blade means mounted on the frame, guide means on the frame for guiding stalks for relative movement along paths toward said cutter blade means as the vehicle moves forwardly through the stalks, a plurality of transversely extending stabilizer fingers mounted for spaced-apart serial movement along a path which extends along the guide means toward the cutter blade means and drive means for moving the fingers in a rearward direction relative to the vehicle whereby the fingers act to hold stalks upright as they are guided towards the cutter blade means, an upwardly facing seed receiving pan disposed adjacent the guide means and which is open throughout its entire length, a take-away conveyor comprising an endless belt and means mounting the belt for movement in vertically spaced upper and lower runs, and drive means coupled to the take-away conveyor for moving its upper run in the direction from the cutter blade means toward the crop receiving conveyor, said endless belt including a transversely extending flap which projects from the lower run of the belt in a direction downwardly and rearwardly of the header assembly, a bottom panel mounted on the frame in close-spaced relationship below the lower run of the take-away conveyor, and control means for operating the drive means to selectively reversely drive the take-away conveyor with the lower run of the belt moving in a direction toward the crop receiving conveyor whereby the flap means moves across the upper surface of the panel and scoops the crop collected thereon in a direction toward the crop receiving conveyor.

* * * * *